O. H. BUCK.
WOVEN WIRE CONVEYER.
APPLICATION FILED MAY 10, 1917.

1,262,745.

Patented Apr. 16, 1918.

Inventor
OLLIE H. BUCK.

By
Lockwood [Lockwood]
Attorneys

UNITED STATES PATENT OFFICE.

OLLIE HALBERT BUCK, OF KOKOMO, INDIANA.

WOVEN-WIRE CONVEYER.

1,262,745.

Specification of Letters Patent.   Patented Apr. 16, 1918.

Application filed May 10, 1917.  Serial No. 167,826.

*To all whom it may concern:*

Be it known that I, OLLIE HALBERT BUCK, a citizen of the United States, and a resident of Kokomo, county of Howard, and State of Indiana, have invented a certain new and useful Woven-Wire Conveyer; and I do hereby declare that the following is a full, clear, and exact description thereof, reference being had to the accompanying drawings, in which like letters refer to like parts.

This invention relates to a flexible woven wire conveyer especially adapted for general conveying purposes in factories. This conveyer is adapted to take the place of endless conveyers made of leather or canvas belting generally used for such purposes, and has the advantage over conveyers made of other material in that it is more serviceable and economical and is more sanitary.

The main feature of this invention is the construction of the border of the woven wire conveyer which will give it a smooth finish, and eliminate the projecting loops, knots and rough ends of the wire mesh so as to prevent any tearing or snagging. Heretofore bordered conveyers have not been used owing to the fact that they would not give or yield, while the wire mesh would stretch and yield so that the conveyer would practically run on its cable border. The border cable also would not permit of the stretching of the conveyer and would not allow for the contraction and expansion thereof. It has, therefore, always been impractical to use bordered tables with the result that the woven wire conveyers had ragged edges which had a tendency to stretch more than the interior portion so as to permit objects to fall therefrom. By means of the present invention the disadvantages of the borderless conveyers have been overcome and the belting strengthened while at the same time the stretching, contraction and expansion thereof is permitted and an even tension maintained.

The full nature of the invention will be understood from the accompanying drawings and the following description and claims.

Figure 1:
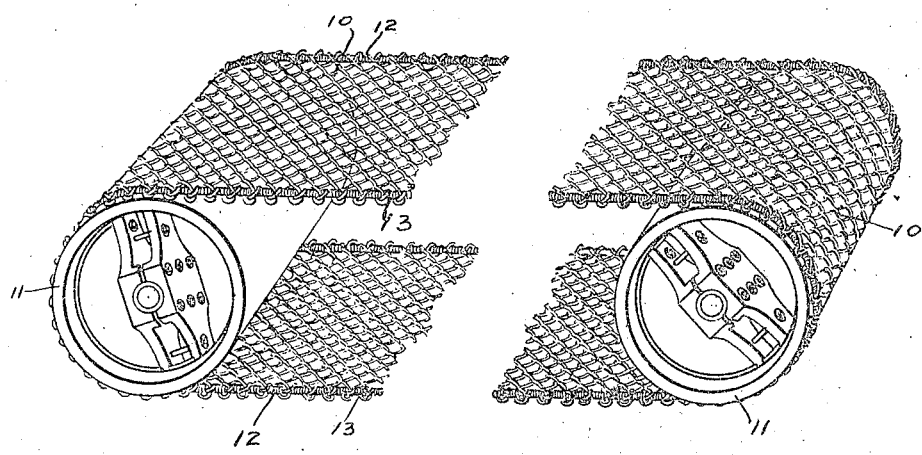
Figure 2:
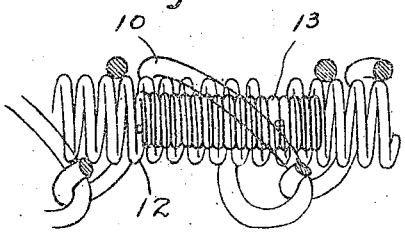

Figure 1 is a perspective view of a flexible woven wire conveyer. Fig. 2 is a plan view showing an enlarged portion of the border of the conveyer.

In the drawings there is shown a flexible woven wire conveyer composed of a wire mesh 10 woven in the form of a belt which is adapted to pass around the drum 11 so as to act as an endless conveyer for general conveying purposes. Woven into the wire mesh so as to be secured thereto and extending along each border thereof there are coil spring cables 12 joined at their ends by threaded studs 13 so as to make the borders endless. The construction of the coil spring borders are such that they will maintain an even tension with the wire mesh conveyer, and while they strengthen said conveyer they will stretch therewith and permit of any contraction or expansion thereof. At the same time they will give a smooth finish to the conveyer and prevent the edges thereof from drooping or sagging so that a substantially smooth and level surface may be maintained. The cables 12 are secured to the wire mesh 10 by extending the end of each wire beyond the cable and then bending said wire around the cable until the free end of the mesh wire is positioned at the inside of the cable and in alinement with the wire mesh forming the belt. The bending of the end of the wire around the cable forms a loop on each end section of each transversely extending wire which is extended through or interwoven with the loop or bent over portion of the next succeeding wire, thereby not only securing the cables along the edges of the wire mesh or belt but interlocking the ends of the wires together, and by extending the free ends of each wire to the inside of the cable, an absolutely finished edge is provided for the belt. The wires forming the mesh or belt are also preferably so constructed, that when interwoven with each other the end of one wire will pass over one face of the belt, while the end of the next succeeding wire will pass to the opposite side of the belt, so that said ends when bent over, extend in opposite directions to each other, thus avoiding any possibility of the cables becoming disengaged from the belt, should the bent over ends on one face of the belt become straightened out.

The invention claimed is:

1. An endless conveyer formed of strands of wire interwoven with each other to form a mesh, a coiled spring cable at each edge of the conveyer, the ends of the wires forming the mesh being formed into loops and said loops extended around said cables, the looped portion of one wire being interwoven with the looped portion of the adjacent wire and threaded studs adapted to be screwed into the meeting ends of said cables to form an endless structure.

2. An endless conveyer formed of strands of wire interwoven together to form a yielding and pliable mesh, an endless, yielding cable at each edge of said conveyer, the ends of the wires forming the mesh being bent around said cables, the end of one wire extending in an opposite direction to the end of the next succeeding wire, said ends terminating adjacent the inner faces of the cables, the looped portion of one wire being interwoven with the looped portion of the next succeeding wire and threaded studs adapted to be screwed into the meeting ends of said cables to form an endless structure.

In witness whereof I have hereunto affixed my signature.

OLLIE HALBERT BUCK.